US012302896B2

United States Patent
Li et al.

(10) Patent No.: US 12,302,896 B2
(45) Date of Patent: May 20, 2025

(54) AUTOMATIC BIOLOGICAL SAMPLE LIBRARY

(71) Applicant: SUZHOU BASECARE MEDICAL DEVICE CO., LTD., Jiangsu (CN)

(72) Inventors: Hao Li, Jiangsu (CN); Lei Jiang, Jiangsu (CN); Honghua Shen, Jiangsu (CN); Yongjie Niu, Jiangsu (CN); Quan Gan, Jiangsu (CN); Bo Liang, Jiangsu (CN)

(73) Assignee: SUZHOU BASECARE MEDICAL DEVICE CO., LTD., Jiangsu (CN)

( * ) Notice: Subject to any disclaimer, the term of this patent is extended or adjusted under 35 U.S.C. 154(b) by 693 days.

(21) Appl. No.: 17/767,464

(22) PCT Filed: Nov. 26, 2019

(86) PCT No.: PCT/CN2019/121072
§ 371 (c)(1),
(2) Date: Apr. 8, 2022

(87) PCT Pub. No.: WO2021/068373
PCT Pub. Date: Apr. 15, 2021

(65) Prior Publication Data
US 2023/0329230 A1    Oct. 19, 2023

(30) Foreign Application Priority Data
Oct. 8, 2019 (CN) .......................... 201910948028.0

(51) Int. Cl.
*A01N 1/145* (2025.01)

(52) U.S. Cl.
CPC .................................. *A01N 1/145* (2025.01)

(58) Field of Classification Search
CPC ............ A01N 1/145; B01J 2219/00596; B01J 2219/00659; B01J 2219/00722; B01J 19/0046; B01L 7/52
(Continued)

(56) References Cited

U.S. PATENT DOCUMENTS

| | | |
|---|---|---|
| 5,964,095 A | 10/1999 | Coelho et al. |
| 8,925,334 B2 | 1/2015 | Zimmermann et al. |

FOREIGN PATENT DOCUMENTS

| | | |
|---|---|---|
| CN | 105857932 A | 8/2016 |
| CN | 105857937 A | 8/2016 |

(Continued)

OTHER PUBLICATIONS

CN105857941A Machine English Translation (Year: 2016).*
(Continued)

*Primary Examiner* — Michael L Hobbs
*Assistant Examiner* — Lenora A Abel
(74) *Attorney, Agent, or Firm* — Howson & Howson LLP

(57) ABSTRACT

An automatic biological sample library, includes a frame, an upper computer, a control system, a liquid nitrogen tank, an insulated chamber, a transfer container, a rotary-disk rotating module, a basket lifting module, a tray shoveling module, a tube picking module and a transfer module. The rotary-disk rotating module, the basket lifting module, the tray shoveling module, the tube picking module and the transfer module are electrically connected to the control system. The automatic biological sample library includes the upper computer and the control system, and therefore can automatically control operations of the rotary-disk rotating module, the basket lifting module, the tray shoveling module, the tube picking module and the transfer module, such that automatic depositing and retrieving biological samples are achieved, human interference is reduced, the safety, (Continued)

reliability and convenience of depositing and retrieving are improved, automatic data management, data sharing and data analysis of biological sample information are realized.

10 Claims, 7 Drawing Sheets

(58) Field of Classification Search
USPC .................................................. 435/307.1
See application file for complete search history.

(56) References Cited

FOREIGN PATENT DOCUMENTS

| CN | 105857941 A | * | 8/2016 | ........... A01N 1/0252 |
|----|-------------|---|--------|---------|
| CN | 206156177 U |   | 5/2017 |         |
| CN | 208647604 U |   | 3/2019 |         |
| EP | 2492663 A2  |   | 8/2012 |         |
| JP | 2002-511827 A |   | 4/2002 |         |
| WO | 2005/108883 A1 |   | 11/2005 |         |

OTHER PUBLICATIONS

International Search Report of the International Searching Authority issued for International PCT Application No. PCT/CN2019/121072 on Jun. 30, 2020.
Search Report issued for Chinese Patent Application No. 2019109480280 (date unknown).
Office Action issued for Chinese Patent Application No. 2019109480280 (date unknown).
European Search Report issued in connection with counterpart European Patent Application No. 19948565.7 on Oct. 9, 2023.

* cited by examiner

AUTOMATIC BIOLOGICAL SAMPLE LIBRARY

CROSS-REFERENCE TO RELATED APPLICATION(S)

This is a national stage application filed under 37 U.S.C. 371 based on International Patent Application No. PCT/CN2019/121072, filed Nov. 26, 2019, which claims priority to Chinese Patent Application No. 201910948028.0 filed Oct. 8, 2019, the disclosures of which are incorporated herein by reference in their entireties.

FIELD

The present disclosure relates to the technical field of biological sample storage, in particular to an automatic biological sample library.

BACKGROUND

A biological sample library is a device for standardized collection, processing, and storage of biological samples such as biological macromolecules, cells, tissues, and organs from healthy or diseased organisms. Most biological samples need to be stored in a cryogenic environment, particularly some biological sample libraries for depositing cells infused into the human body, their storage environments need to be at a temperature close to that of liquid nitrogen. Taking the biological sample library for depositing embryos of human as an example, the embryos first need to go through a complex cooling process and are then put into liquid nitrogen to be stored. The embryos need to be protected in cryogenic environments throughout the depositing process, to prevent the embryos from being frozen and thawed repeatedly and from being subject to damage to their viability caused thereby. After the embryos are cooled down, the embryos are placed in a transfer container filled with liquid nitrogen, and then the embryos in the transfer container are manually sent to a larger liquid nitrogen tank. When the embryos need to be retrieved, the embryos are retrieved from the liquid nitrogen tank, placed in the transfer container, and transported to a target location.

In conventional biological sample libraries, generally depositing and retrieving biological samples are manually or semi-automatically operated, resulting in a weak automation in depositing and retrieving operations of the biological sample libraries.

SUMMARY

In view of above, in order to address the problem of a weak automation in depositing and retrieving operations of the biological sample libraries, it is necessary to provide an automatic biological sample library.

An automatic biological sample library is provided, which includes: a frame, an upper computer, a control system, a liquid nitrogen tank, an insulated chamber, a transfer container, a rotary-disk rotating module, a basket lifting module, a tray shoveling module, a tube picking module, and a transfer module.

The upper computer is arranged on the frame.

The control system is electrically connected to the upper computer.

The liquid nitrogen tank is arranged on the frame, and the liquid nitrogen tank includes a first insulated tank body, a rotary-disk assembly accommodated in the first insulated tank body, multiple baskets placed on the rotary-disk assembly, and an automatic cover capable of being selectively fitted with any one of the multiple baskets.

The insulated chamber is arranged to cover above the automatic cover, and the insulated chamber includes a first compartment and a second compartment which are in communication with each other through a communicative port, where the first compartment is provided with a tube outlet, and the second compartment is internally provided with a cooling module.

The transfer container is arranged on the frame, the transfer container includes a second insulated tank body, a sample holder accommodated in the second insulated tank body, and a tank body cover for closing the second insulated tank body, and the sample holder is configured to hold a cryopreservation tube that is moved in or moved out through the tube outlet.

The rotary-disk rotating module is electrically connected to the control system and is at least partially arranged in the second compartment. The rotary-disk rotating module is configured to cooperate with the rotary-disk assembly to drive the rotary-disk assembly to rotate.

The basket lifting module is electrically connected to the control system and is at least partially arranged in the second compartment. The basket lifting module is configured to cooperate with the automatic cover to drive the automatic cover to rise and fall.

The tray shoveling module is electrically connected to the control system, and is at least partially arranged in the first compartment, and is configured to deposit a cryopreservation tray into a basket lifted by the basket lifting module or retrieve a cryopreservation tray from a basket lifted by the basket lifting module.

The tube picking module is electrically connected to the control system, and is at least partially arranged in the first compartment. The tube picking module is configured to deposit a cryopreservation tube into a cryopreservation tray shoveled by the tray shoveling module, or retrieve a cryopreservation tube from a cryopreservation tray shoveled by the tray shoveling module, and is configured to move in or move out a cryopreservation tube through the tube outlet;

The transfer module is electrically connected to the control system, arranged on the frame, and capable of driving the transfer container to move into the tube outlet or move away from the tube outlet.

The above technical solutions have at least the following technical effects: the automatic biological sample library provided by the present technical solution includes the upper computer and the control system, can automatically control the operations of the rotary-disk rotating module, the basket lifting module, the tray shoveling module, the tube picking module and the transfer module, realizes the automatic depositing and retrieving of biological samples, reduces human interference, improves the security, reliability and convenience of depositing and retrieving of biological samples, and realizes automatic data management, data sharing and data analysis of biological sample information. The automatic cover can seal the liquid nitrogen tank in a case where depositing or retrieving of biological samples is not performed. The insulated chamber covers above the automatic cover. The rotary-disk rotating module, the basket lifting module, the tray shoveling module and the tube picking module are each at least partially arranged in the insulated chamber, and the biological sample is placed in the transfer container during the process of being transferred, so the biological samples are always deposited, retrieved, or transferred in cryogenic environments, thus preventing the biological samples from being repeatedly frozen and thawed and being subject to the damage to their viabilities caused thereby.

In one of the implementations, the liquid nitrogen tank further includes a manual cover and a quick detachment mechanism configured to lock the manual cover.

In one of the implementations, the first compartment is provided with a partition structure at a position higher than the communicative port, the partition structure partitions the first compartment into an upper compartment and a lower compartment in a height direction, and the partition structure is provided with a mechanism movement port via which the upper compartment is in communication with the lower compartment.

In one of the implementations, a top of the first compartment in the height direction is provided with a first sealing hood in communication with the upper compartment, and a top of the second compartment in the height direction is provided with a second sealing hood in communication with the second compartment.

The rotary-disk rotating module includes a first driving assembly and a rotation assembly driven by the first driving assembly. The first driving assembly is at least partially located between the second compartment and the second sealing hood, the rotation assembly is located inside the second compartment, and the rotation assembly is fitted to the rotary-disk assembly.

The basket lifting module includes a second driving assembly and the lifting assembly driven by the second driving assembly. The second driving assembly is located at least partially between the second compartment and the second sealing hood, the lifting assembly is located inside the second compartment, and the lifting assembly is fitted to the automatic cover.

The tray shoveling module includes a third driving assembly and a tray shoveling assembly driven by the third driving assembly. The third driving assembly is located at least partially between the upper compartment and the first sealing hood, and the tray shoveling assembly is located inside the lower compartment.

The tube picking module includes a fourth driving assembly and a tube picking assembly driven by the fourth driving assembly. The fourth driving assembly is located at least partially between the upper compartment and the first sealing hood, and the tube picking assembly is located inside the lower compartment.

In one of the implementations, the partition structure is provided with a transparent plate capable to enable light transmitting from one to another between the upper compartment and the lower compartment, and a machine vision module is provided on a side of the upper compartment at the transparent plate.

In one of the implementations, an inner sealing cover configured to close the tube outlet is provided inside the first compartment, and an outer sealing cover configured to close the tube outlet is provided outside the first compartment.

In one of the implementations, the insulated chamber is provided with a manual intervention port, the insulated chamber is further provided with an intervention port sealing cover and an observation window, where the intervention port sealing cover is configured for closing the manual intervention port.

In one of the implementations, the transfer module includes an elevating assembly and a translating assembly which are connected to each other, the translating assembly or the elevating assembly is provided with a pallet, and the transfer container is placed on the pallet.

In one of the implementations, the automatic biological sample library further includes a code scanning module arranged outside the first compartment. The code scanning module is electrically connected to the control system and is configured to scan a code of a cryopreservation tube retrieved by the tube picking module, for identification, and the first compartment is provided with a code scanning window at a position corresponding to the code scanning module, where the code scanning window is light-transmittable.

In one of the implementations, the automatic biological sample library further includes a cover opening module arranged on the frame and configured to automatically perform cover-opening or cover-closing for the transfer container.

Figure 1:
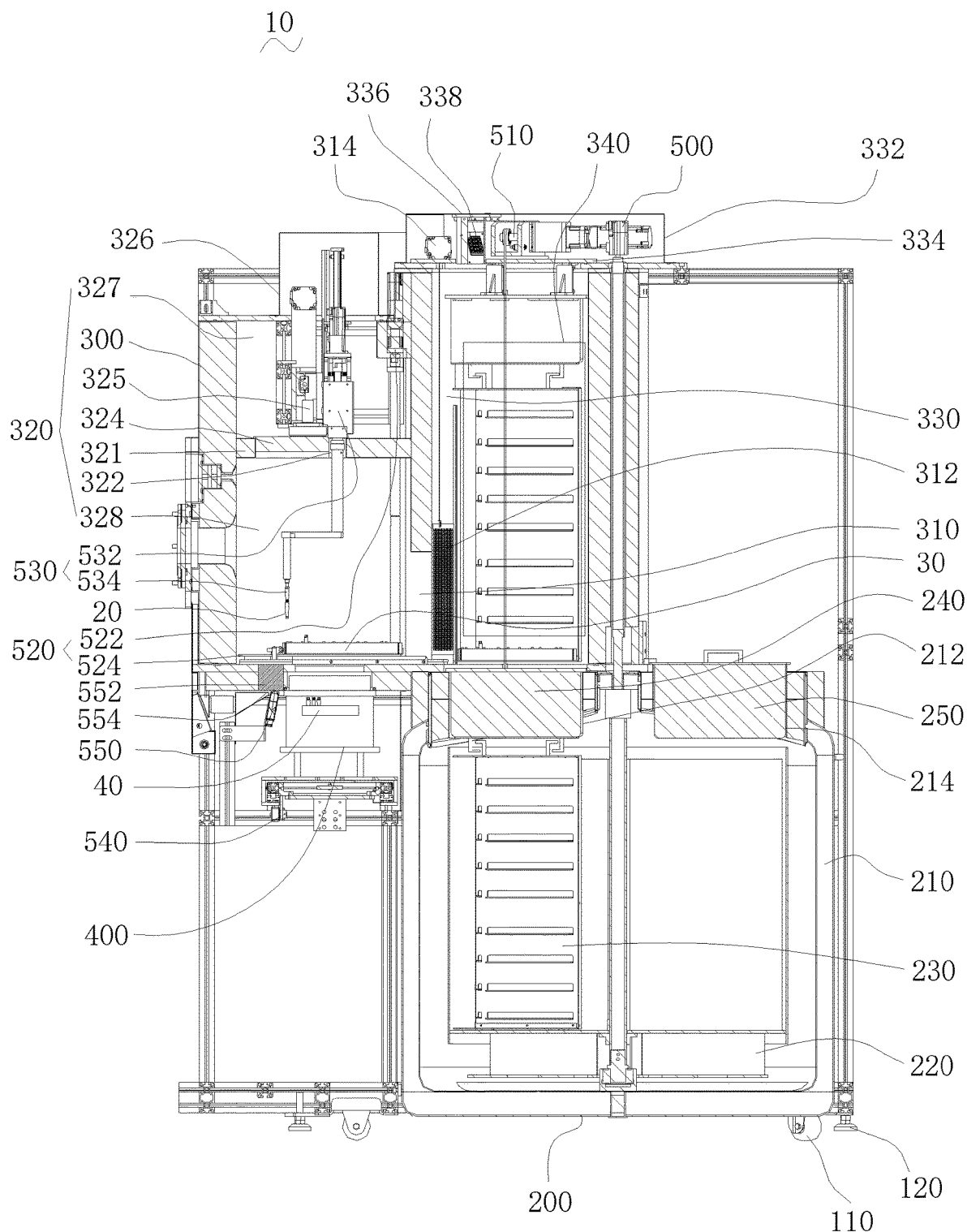
FIG. 1 is a schematic structural view of an automatic biological sample library according to an embodiment of the present disclosure.

| Reference list | | |
|---|---|---|
| 10 Automatic biological sample library | 100 Frame | 110 Roller |
| 120 Adjustable footer | 130 Emergency power supply | 140 Upper computer |
| 200 Liquid nitrogen tank | 210 First insulated tank body | 212 Automatic port |
| 214 Manual port | 220 Rotary-disk assembly | 230 Basket |
| 240 Automatic cover | 250 Manual cover | 300 Insulated chamber |
| 310 Communicative port | 312 Automatic isolation door | 314 Elevating module |

-continued

Reference list

| | | | | | |
|---|---|---|---|---|---|
| 320 | First compartment | 321 | Partition structure | 322 | Mechanism movement port |
| 323 | Sealing member | 324 | Transparent plate | 325 | Machine vision module |
| 326 | First sealing hood | 327 | Upper compartment | 328 | Lower compartment |
| 329 | Tube outlet | 330 | Second compartment | 332 | Second sealing hood |
| 334 | Second partition plate | 336 | Gas outlet | 338 | Heating module |
| 340 | Cooling module | 350 | Inner sealing cover | 352 | Driving module |
| 360 | Outer sealing cover | 370 | Manual intervention port | 372 | Intervention port sealing cover |
| 374 | Observation window | 376 | Dew removal module | 400 | Transfer container |
| 500 | Rotary-disk rotating module | 510 | Basket lifting module | 520 | Tray shoveling module |
| 522 | Third driving assembly | 524 | Tray shoveling assembly | 530 | Tube picking module |
| 532 | Fourth driving assembly | 534 | Tube picking assembly | 540 | Transfer module |
| 542 | Elevating assembly | 544 | Translating assembly | 550 | Code scanning module |
| 552 | Code scanning window | 554 | Dew removal module | 560 | Cover opening module |
| 570 | Elevating door | 580 | Transfer port | 600 | Multi-shaft manipulator |
| 610 | X-shaft | 620 | Z-shaft | 630 | R-shaft |
| 632 | First vertical segment | 634 | Horizontal segment | 636 | Second vertical segment |
| 640 | Fixed seat | 710 | First pallet | 720 | Second pallet |
| 20 | Cryopreservation tube | 30 | Cryopreservation tray | 40 | Sample box |

DETAILED DESCRIPTION

In order to make the above-described object, features and advantages of the present disclosure more obvious and understandable, the embodiments of the present disclosure are described in detail hereinafter in conjunction with the drawings. Many specific details are set forth in the description hereinafter to facilitate a thorough understanding of the present disclosure. However, the present disclosure can be implemented in many other ways different from those described herein, and those skilled in the art can make similar improvements without departing from the connotation of the present disclosure. Therefore, the present disclosure is not limited by the embodiments disclosed below.

It is to be noted that when an element is described as being "fixed to" another element, it may be that the element is directly fixed to the other element or is fixed to the other element through an intermediated element. When an element is described as being "connected to" another element, it may be that the element is directly connected to the other element or is connected to the other element through an intermediated element.

Most of the conventional biological sample libraries are operated manually or semi-automatically, data management is generally performed manually, and small-capacity liquid nitrogen tanks are mostly used as storage containers in a scattered arrangement, causing that manual management is troublesome and resulting in a low efficiency and a high error rate.

Figure 2:
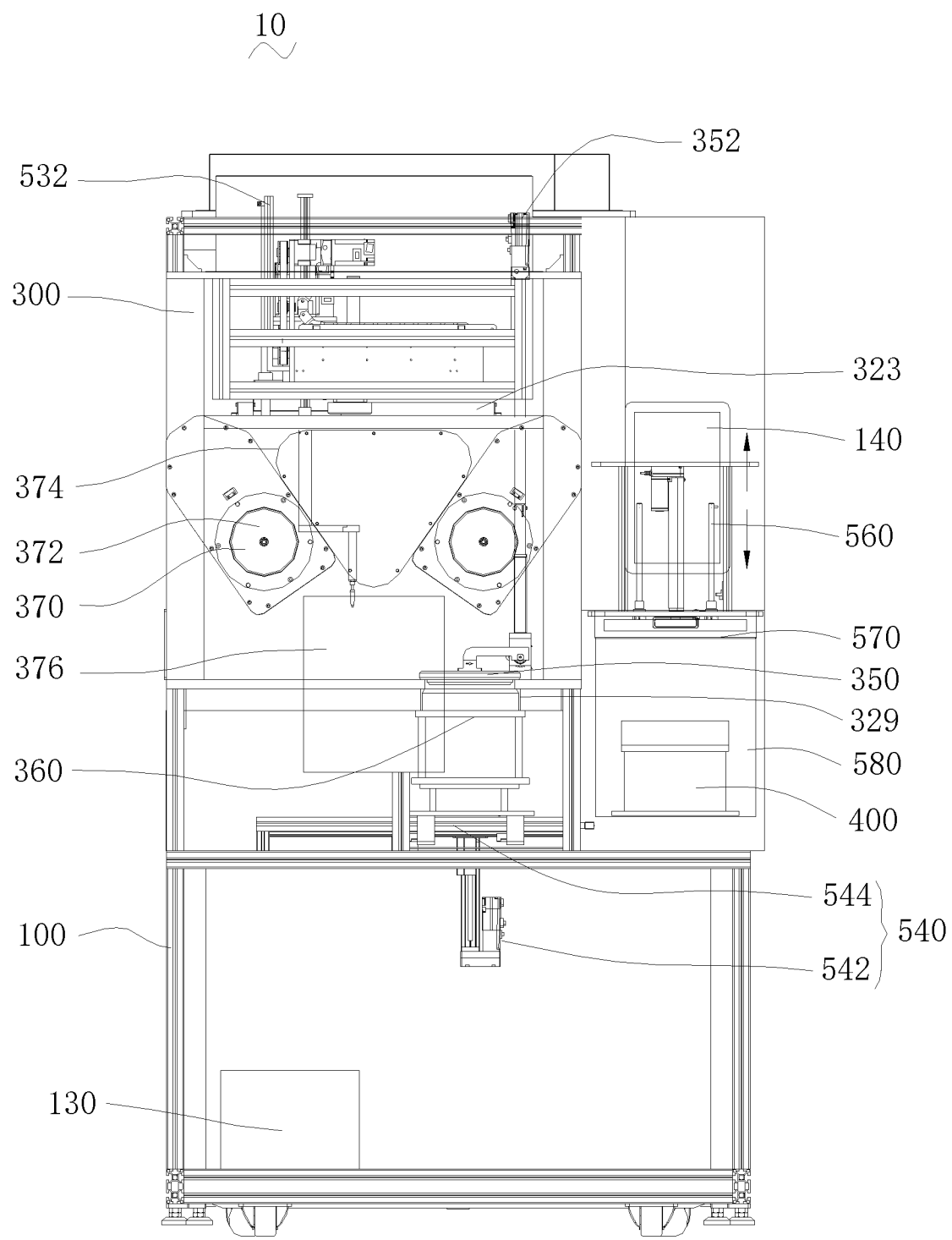
FIG. 2 is a schematic structural view of the automatic biological sample library according to the embodiment of the present disclosure viewed from another angle.

In view of this, please refer to FIG. 1 and FIG. 2, an automatic biological sample library 10 is provided according to embodiments of the present disclosure. The automatic biological sample library 10 includes: a frame 100; an upper computer 140, which is arranged on the frame 100; a control system, which is electrically connected to the upper computer 140; a liquid nitrogen tank 200, which is arranged on the frame 100 and includes a first insulated tank body 210, a rotary-disk assembly 220 accommodated in the first insulated tank body 210, multiple baskets 230 placed on the rotary-disk assembly 220, and an automatic cover 240 capable of being selectively fitted with any one of the multiple baskets 230; an insulated chamber 300 arranged to cover above the automatic cover 240 and including a first compartment 320 and a second compartment 330 which are in communication with each other through a communicative port 310, where the first compartment 320 is provided with a tube outlet 329, and the second compartment 330 is internally provided with a cooling module 340; a transfer container 400, which is arranged on the frame 100 and includes a second insulated tank body, a sample holder accommodated in the second insulated tank body, and a tank body cover for closing the second insulated tank body, and the sample holder is configured to hold a cryopreservation tube 20 that is moved in or moved out through the tube outlet 329.

The frame 100 is configured to provide a bearing force and a support force for the whole device, and also configured to bring together multiple mechanisms of the whole device to improve integration. Rollers 110 each with a brake may be further provided at a bottom of the frame 100, so that the whole device can be transferred in a case where an emergency occurs. Adjustable footers 120 may further be provided at the bottom of the frame 100 for adjusting the levelness of the frame 100.

The upper computer 140 includes an industrial personal computer, a display screen, a software system, etc., and therefore can realize automatic data management, realize human-computer interaction and real-time monitoring, and has the backup function of automatic data mirror to ensure data security. The display screen has a touch control function, and can be lifted, lowered or translated to facilitate operations for different operators. The upper computer 140 further includes a remote communication module, and therefore can be interconnected with a central server to realize big data aggregation, data sharing and data analysis. The upper computer 140 further includes an alarm module, and when the device is abnormal, the software system can control the alarm module to alarm.

The control system is configured to receive instructions from the upper computer 140 and execute the instructions to enable the automatic modules such as a rotary-disk rotating module 500 and a basket lifting module 510 to implement operations such as start and stop. The control system controls generally by programmable logic controller (PLC). When the upper computer 140 is in normal operation, the upper computer 140 controls the control system to control the automatic modules normally. When the upper computer 140 fails, the control system can control the automatic modules independently without adversely affecting the basic operations, thereby ensuring the safety and reliability of operation of the whole device and ensuring the safety of biological samples.

The liquid nitrogen tank 200 is configured to store biological samples, and can stably create a storage temperature under subzero 180° C. for a long time. In which, liquid phase of liquid nitrogen or gas phase of liquid nitrogen can be used for refrigeration. The liquid nitrogen tank 200 includes a first insulated tank body 210, a rotary-disk assembly 220, baskets 230 and a automatic cover 240. The first insulated tank body 210 is embodied as a double-layer vacuum structure, and a vacuum layer is wrapped by a thermal insulation material and an adsorption material, which can achieve a good thermal insulation effect. Moreover, the top of the first insulated tank body 210 is also filled with a thermal insulation material, for example, the top of the first insulated tank body 210 may be provided with a thermal insulation ring. This arrangement can reduce thermal conducted to the outside environment at normal temperature, and can also prevent the top of the first insulated tank body 210 from being subject to frost.

The rotary-disk assembly 220 is configured to hold multiple baskets 230. By rotating the rotary-disk assembly 220, the baskets 230 at different positions can be rotated to a position directly facing the automatic cover 240, so that the automatic cover 240 can be selectively fitted with the baskets 230 at this position. Herein, fitting means that the automatic cover 240 and the basket 230 can abut with each other in a vertical direction so that the automatic cover 240 can hoist the basket 230, and can be separated from the basket 230 in a horizontal direction when the basket 230 is rotated. The rotary-disk assembly 220 includes a rotary-disk evenly distributed with a number of sectors and a central shaft that drives the rotary-disk to rotate. Each sector has a basket 230 placed thereon. The baskets 230 are evenly distributed in several layers in the vertical direction, and each layer has a cryopreservation tray 30 placed thereon. Multiple cryopreservation tubes 20 are distributed on each cryopreservation tray 30. This arrangement increases storage density and improves space utilization.

The top of the first insulated tank body 210 is provided with an automatic port 212, and the automatic cover 240 is configured to close the automatic port 212. The automatic cover 240 has a hook on its side facing the inside of the first insulated tank body 210, and each of the baskets 230 has a hook, on its top, that is centrally symmetrical with the hook of the automatic cover 240 when directly facing the hook of the automatic cover 240, and the hooks are generally L-shaped or L-shaped-like. When the basket 230 is rotated to a position directly facing the automatic cover 240, the two sets of hooks will form a state that they can abut with each other in the vertical direction or form a state that they can abut with each other in the vertical direction after moving for a certain distance. When the automatic cover 240 is lifted, the automatic cover 240, with its hook cooperating with the hook of the basket 230, can lift the basket 230 from the first insulated tank body 210. When the basket 230 does not need to be lifted, the automatic cover 240 closes the automatic port 212 to ensure the storage temperature in the first insulated tank body 210 and prevent the cryo-temperature from spreading into the insulated chamber 300 in the non-depositing and retrieving state to adversely affect the mechanism located therein. Multiple liquid level sensors and temperature sensors electrically connected to the control system are arranged in the first insulated tank body 210 to monitor the liquid nitrogen level and liquid nitrogen temperature in the first insulated tank body 210 in real time so that liquid nitrogen can be replenished in time. The first insulated tank body 210 further includes a manual liquid replenishment port and an automatic liquid replenishment port, so that liquid replenishment can be performed in a timely manner.

The insulated chamber 300 is formed to have a hollow cavity, and the hollow cavity is divided into the first compartment 320 and the second compartment 330 through the communicative port 310 to realize providing different temperatures for different compartments. The communicative port 310 is arranged in the vertical direction, such that the first compartment 320 is configured to provide an operating space for shoveling the cryopreservation trays 30 and picking the cryopreservation tubes 20, etc., and the second compartment 330 is configured to provide an operating space for lifting the baskets 230. The communicative port 310 may extend upward along the height from the bottom of the insulated chamber 300, or may extend upward along the height from a portion at a certain distance from the bottom of the insulated chamber 300. Moreover, an automatic isolation door 312 with a porous structure for closing the communicative port 310 may further be provided in the first compartment 320 or the second compartment 330, and an elevating module 314 for driving the automatic isolation door 312 to rise or fall may be located at a higher position in the first compartment 320 or the second compartment 330. When the device starts to cool down and the tube picking operation is not performed, the automatic isolation door 312 is removed to ensure that the cryo-temperature can be quickly transferred to the first compartment; when the temperature drops to a set value and the tube picking operation starts, the automatic isolation door 312 closes the communicative port 310 to ensure that if a cryopreservation tube 20 is accidentally dropped, the cryopreservation tube 20 would not fly into the second compartment 330 so as to avoid consequences to which manual intervention cannot be applied. Furthermore, the porous structure in the automatic isolation door 312 can ensure that the cryo-temperature in the second compartment 330 can still be transferred to the first compartment 320 to ensure the tube picking temperature. The insulated chamber 300 is composed of a thermal insulation material and a profile frame, to have a certain mechanical structural strength while thermal insulation performance is ensured. Multiple temperature sensors electrically connected to the control system are disposed in the insulated chamber 300 to monitor the temperature conditions at different positions in real time to enable the cooling capability of the cooling module 340 to be adjusted in time.

An access port is opened in the bottom of the second compartment 330, the access port covers above the automatic cover 240, and the basket 230 is lifted into the second compartment 330 through the access port or is lowered from the inside of the second compartment 330 to the inside of the first insulated tank body 210 through the access port. In this embodiment, when the automatic cover 240 is lifted, the basket 230 is located in the insulated chamber 300 to avoid direct contact with the external environment at normal temperature, so that the cryopreservation tube 20 is not directly exposed to the air environment, and the biological viability of the biological sample is improved.

The first compartment 320 is provided with the tube outlet 329 for moving the cryopreservation tube 20 out from the insulated chamber 300 or moving the cryopreservation tube 20 into the insulated chamber 300. The specific position for opening the tube outlet 329 is selected according to the overall layout. For example, if the operation of moving out or moving in is performed via a lateral side of the first compartment 320, the tube outlet 329 is opened at the lateral side of the first compartment 320. If the operation of moving out or moving in is performed via the bottom of the first compartment 320, the tube outlet 329 is opened at the bottom of the first compartment 320. It is not limited herein.

The second compartment 330 is arranged with the cooling module 340 therein, and the cooling module 340 is configured to provide biological samples with an environment close to the cryo-temperature of the liquid nitrogen in the first insulated tank body 210, so as to avoid a sudden temperature rise during the transfer process and improve the biological activity of the biological samples. The cooling module 340 may adopt liquid nitrogen spraying, multi-stage compressor refrigeration, Stirling refrigeration and other methods. The cold air is transferred from the second compartment 330 to the first compartment 320 through the communicative port 310, so that a space around the cooling module 340 in the second compartment 330 has a relatively low temperature, and a space adjacent to the communicative port 310 in the first compartment 320 has a relatively low temperature, both of which are cryo-temperature environments at a temperature about under subzero 130° C. During a standby process, the cooling module 340 does not work, and the insulated chamber 300 is in an environment at a room temperature. Before the depositing and retrieving operation, the temperature in the insulated chamber 300 is first cooled to under subzero 130° C. by the cooling module 340.

The transfer container 400 is configured to transport a target cryopreservation tube 20 picked out from the liquid nitrogen tank 200 to a target location, or to transport a target cryopreservation tube 20 to the insulated chamber 300 to be deposited in the liquid nitrogen tank 200. It can be understood that the transfer container 400 can close the tube outlet 329. The transfer container 400 includes the second insulated tank body, the sample holder and the tank body cover. The second insulated tank body is a hollow structure with an opening, the tank body cover is configured to close the opening, the sample holder is accommodated in the second insulated tank body, and a sample box 40 is placed on the sample holder and is configured to hold the cryopreservation tube 20 moved in or moved out through the tube outlet 329. When the transfer container 400 is in the non-depositing and retrieving state, the tank body cover closes the opening; when the transfer container 400 is required to perform depositing or retrieving, the tank body cover is opened. In order to monitor the transportation of the transfer container 400, a temperature sensor, a liquid level sensor, an alarm module, a remote communication module, etc. are integrated in the transfer container 400 to perform recording, storing, importing, exporting and the like of the information of biological samples, to communicate with the sample library in a wired manner or in a wireless manner, and to enter the saved or recorded data into a database of the sample library.

When to deposit a target cryopreservation tube 20, the transfer container 400 where the target cryopreservation tube 20 is deposited is transported to the insulated chamber 300, and the target cryopreservation tube 20 is moved into the insulated chamber 300 through the tube outlet 329, and is moved into the liquid nitrogen tank 200 through the access port. When to retrieve a target cryopreservation tube 20, the basket 230 where the target cryopreservation tube 20 is located is moved from the liquid nitrogen tank 200 into the insulated chamber 300, and the target cryopreservation tube 20 is moved into the transfer container 400 through the tube outlet 329.

The automatic biological sample library 10 further includes: the rotary-disk rotating module 500, the basket lifting module 510, a tray shoveling module 520, a tube picking module 530 and a transfer module 540. The rotary-disk rotating module 500 is electrically connected to the control system and is at least partially arranged in the second compartment 330. The rotary-disk rotating module 500 is configured to cooperate with the rotary-disk assembly 220 to drive the rotary-disk assembly 220 to rotate. The basket lifting module 510 is electrically connected to the control system and is at least partially arranged in the second compartment 330. The basket lifting module 510 is configured to cooperate with the automatic cover 240 to drive the automatic cover 240 to rise and fall. The tray shoveling module 520 is electrically connected to the control system, and is at least partially arranged in the first compartment 320, and is configured to deposit a cryopreservation tray 30 into a basket 230 lifted by the basket lifting module 510, or retrieve a cryopreservation tray 30 from a basket 230 lifted by the basket lifting module 510. The tube picking module 530 is electrically connected to the control system, and is at least partially arranged in the first compartment 320, and is configured to deposit a cryopreservation tube 20 into a cryopreservation tray 30 shoveled by the tray shoveling module 520, or retrieve a cryopreservation tube 20 from a cryopreservation tray 30 shoveled by the tray shoveling module 520, and is configured to move in or move out a cryopreservation tube 20 through the tube outlet 329. The transfer module 540 is electrically connected to the control system, and is arranged on the frame 100, and can drive the transfer container 400 to move into the tube outlet 329 or move away from the tube outlet 329.

The rotary-disk rotating module 500 is fitted to the rotary-disk assembly 220. Herein, the fitting may be a connection relationship therebetween, such as welding or screw locking, or may be a position-limiting and matching relationship in a radial direction, such as engagement between a groove and a protrusion, such that the rotary-disk assembly 220 can be driven by the rotary-disk rotating module 500 to rotate. For example, the rotary-disk rotating module 500 includes a motor with a motor shaft, and a transmission shaft connected to the motor shaft. The rotary-disk assembly 220 includes a rotary-disk and a central shaft that drives the rotary-disk to rotate. The central shaft is connected to the transmission shaft by coupling, and is driven to rotate by the rotation of the transmission shaft. The rotary-disk rotating module 500 is at least partially arranged in the second compartment 330, in this way, components with poor low temperature resistance such as a motor can be arranged outside the second compartment 330, thereby improving the service life of each of the components.

The basket lifting module 510 is fitted to the automatic cover 240. Herein, the fitting may be a connection relationship, such as welding, screw locking, or may be a position-limiting and matching relationship in the vertical direction, such as clamping jaws, hooks, so that the basket lifting module 510 can lift the automatic cover 240 in the vertical direction. For example, the basket lifting module 510 includes a motor with a motor shaft, and a chain, a pulling rope or the like connected to the motor shaft. The chain, the pulling rope, or the like is connected to the automatic cover 240, and the rotation of the motor shaft can drive the chain, the pulling rope or the like to lift the automatic cover 240 up or to lower the automatic cover 240 down. The basket lifting module 510 is at least partially arranged in the second compartment 330, and components with poor low temperature resistance such as a motor can be arranged outside the second compartment 330 to improve the service life of each of the components.

The tray shoveling module 520 is at least partially arranged in the first compartment 320, and components with poor low temperature resistance such as a motor can be arranged outside the first compartment 320 to improve the service life of each of the components. The tray shoveling module 520 can shovel out a target cryopreservation tray 30 located in a target basket 230 in the second compartment 330, or put a target cryopreservation tray 30 located on the tray shoveling module 520 into a target basket 230.

The tube picking module 530 is at least partially arranged in the first compartment 320, and components with poor low temperature resistance such as a motor can be arranged outside the first compartment 320, thereby improving the service life of each of the components. The tube picking module 530 includes a movable tube taking apparatus capable of taking a target cryopreservation tube 20 located in a cryopreservation tray 30 on the tray shoveling module 520 and moving it away through the tube outlet 329, or, taking a target cryopreservation tube 20 located outside of the tube outlet 329 and placing it into a cryopreservation tray 30 on the tray shoveling module 520.

The transfer module 540 is arranged outside the insulated chamber 300 and can drive the transfer container 400 to move from other positions to the tube outlet 329, or can drive the transfer container 400 to move from the tube outlet 329 to other positions. In the processes of depositing and retrieving, the transfer module 540 drives the transfer container 400 to move back and forth between the tube outlet 329 and other positions. Herein, the other positions may be preset transfer positions of the transfer container 400. The transfer module 540 can be driven by a chain, a pulling rope, a belt, a timing belt, a rack and gear, a ball screw, or the like.

In depositing a target cryopreservation tube 20, the transfer module 540 moves the transfer container 400 containing the target cryopreservation tube 20 to the tube outlet 329, and the tube picking module 530 passes through the tube outlet 329 and retrieves the target cryopreservation tube 20 and places it on a cryopreservation tray 30 that has been shoveled out by the tray shoveling module 520, and the tray shoveling module 520 places the cryopreservation tray 30 depositing the target cryopreservation tube 20 into a basket 230 that has been lifted up by the basket lifting module 510, and the basket lifting module 510 lowers the basket 230 into the liquid nitrogen tank 200.

In retrieving a target cryopreservation tube 20, the rotary-disk rotating module 500 rotates a target basket 230 to be under the automatic cover 240, the basket lifting module 510 drives the automatic cover 240 to lift the target basket 230, and the tray shoveling module 520 shovels out a target cryopreservation tray 30 from the target basket 230, and the tube picking module 530 retrieves the target cryopreservation tube 20 from the target cryopreservation tray 30, and moves the target cryopreservation tube 20 into the transfer container 400 through the tube outlet 329, and the transfer module 540 moves the transfer container 400 to a preset position.

The automatic biological sample library 10 according to the embodiments of the present disclosure may be operated stand-alone or online, for example, can have stand-alone machines interconnected through a transmission system such as an automatic guided vehicle (AGV), a track, or a conveyor chain, to expand capacity, or may be operated in connection with other systems. In this case, a stand-alone automatic biological sample library 10 is provided with a transfer port 580 at the position where the transfer container 400 is placed, and an elevating door 570 configured to close the transfer port 580. The transfer container 400 may be interconnected with other systems through the transfer port 580, and the elevating door 570 may be manually controlled or automatically controlled, and when the automatic control is adopted, the elevating door 570 may be driven by a chain, a pulling rope, a belt, a timing belt, a rack and gear, a ball screw, or the like. The transfer container 400 is transferred between multiple stand-alone machines through the transfer port 580, and the databases of the multiple stand-alone machines are networked to realize data sharing, and cooperate with the unified control scheduling system and integrated data management to realize system expansion, or online operation with other systems.

The automatic biological sample library 10 is further provided with an emergency power supply 130. When an external power supply is failed, the emergency power supply 130 can continue to supply power to ensure completing the operations currently performed and the safety of the biological samples.

The above technical solution has at least the following technical effects: the automatic biological sample library 10 provided by the present technical solution includes the upper computer 140 and the control system, can automatically control the operations of the rotary-disk rotating module 500, the basket lifting module 510, the tray shoveling module 520, the tube picking module 530 and the transfer module 540, realizes the automatic depositing and retrieving of biological samples, reduces human interference, improves the security, reliability and convenience of depositing and retrieving of biological samples, and realizes automatic data management, data sharing and data analysis of biological sample information. The automatic cover 240 can seal the liquid nitrogen tank 200 in a case where depositing or retrieving of biological samples is not performed. The insulated chamber 300 covers above the automatic cover 240. The rotary-disk rotating module 500, the basket lifting module 510, the tray shoveling module 520 and the tube picking module 530 are each at least partially arranged in the insulated chamber 300, and the biological sample is placed in the transfer container 400 during the process of being transferred, so the biological samples are always in cryogenic environments in the process of being deposited and retrieved and transferred, thus preventing the biological samples from being repeatedly frozen and thawed and being subject to the damage to their viabilities caused thereby.

Please continue to refer to FIG. 1, in some embodiments, the liquid nitrogen tank 200 further includes a manual cover 250 and a quick detachment mechanism configured to lock the manual cover 250. A manual port 214 is opened in the top of the first insulated tank body 210, and the manual cover 250 is configured to close the manual port 214. The manual cover 250 is used for an emergency situation. In the process of normal depositing and retrieving, the manual cover 250 is locked by the quick detachment mechanism, and the depositing and retrieving operations of the cryopreservation tray 30 are all performed through the automatic port 212. When a mechanical or electronic transfer component arranged in the insulated chamber 300, for example, the basket lifting module 510, the tray shoveling module 520, etc., has a failure that may be difficultly repaired in a short time, or other emergencies occur, the quick detachment mechanism can be detached, to open the manual cover 250 to deposit or retrieve the cryopreservation tray 30 through the manual port 214.

Further, the quick detachment mechanism includes a rotating member and a pressing member rotatably connected to the rotating member. The pressing member is partially pressed on the manual cover 250 and partially connected to the top of the first insulated tank body 210. When the rotating member rotates for a certain angle, the pressing member may be pressed tightly on the manual cover 250. When the rotating member rotates reversely for a certain angle, the pressing member is separated from the manual cover 250. At this time, the pressing member can be detached and the manual cover 250 can be opened.

Please continue to refer to FIG. 1, in some embodiments, the first compartment 320 is provided with a partition structure 321 at a position higher than the communicative port 310, and the partition structure 321 partitions the first compartment 320 into an upper compartment 327 and a lower compartment 328 in a height direction, and the partition structure 321 is provided with a mechanism movement port 322 via which the upper compartment 327 is in communication with the lower compartment 328. The partition structure 321 is arranged in the horizontal direction and is formed with thermal insulation materials, the thermal insulation materials may be polyisocyanurate (PIR), polyurethane (PUR), expanded polypropylene (EPP), polystyrene foam (EPS), rigid extruded polystyrene foam board (XPS), aerogel or vacuum insulation panels, etc. The partition structure 321 can be arranged at a suitable height position in the first compartment 320 according to the size of the tube picking module 530. For example, the partition structure 321 is arranged at ⅔ of the height or ½ of the height of the first compartment 320, etc., which can provide a large accommodation space for the tube picking module 530, to allow more of the tube picking module 530 to be exposed to an environment at a higher temperature. Correspondingly, the height of the communicative port 310 may be ½ of the height or ⅓ of the height of the lower compartment 328, etc., so as to provide a sufficient transfer space for the cryopreservation tray 30 or the cryopreservation tube 20.

The partition structure 321 divides the first compartment 320 into the upper compartment 327 and the lower compartment 328, which realizes providing different temperatures for different compartments of the first compartment 320. In this case, the temperature of the upper compartment 327 is higher than that of the lower compartment 328, so that part of elements of the moving mechanisms such as the tube picking module 530 and the tray shoveling module 520 can be located in the upper compartment 327, increasing the temperature at which the mechanical components and electronic components are located, thereby increasing the service life of each of the mechanical components and electronic components, and improving reliability of the operations.

The mechanism movement port 322 serves as an opening through which the tube picking module 530 partially passes through the partition structure 321. For example, the tube picking module 530 includes a manipulator and a tube taking mechanism controlled by the manipulator. The manipulator partially passes through the mechanism movement port 322, and the tube taking mechanism is installed at the end of the manipulator, and is located in the lower compartment 328.

Since the tube picking module 530 is arranged to pass through the mechanism movement port 322, a space is left between the tube picking module 530 and the mechanism movement port 322. In this case, the cold air in the lower compartment 328 is prone to entering the upper compartment 327 through the space, which may adversely affect the temperature division effect of the upper compartment 327 and the lower compartment 328. In view of this, a sealing member 323 is provided at the mechanism movement port 322, which can perform a sealing function when the tube picking module 530 moves.

Figure 6:
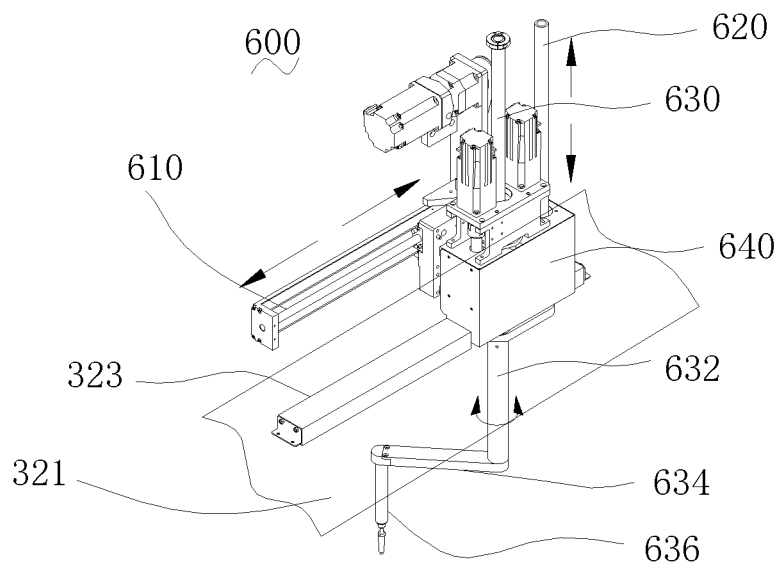
FIG. 6 is a schematic structural view of a multi-shaft manipulator according to an embodiment of the present disclosure.

Taking the multi-shaft manipulator 600 shown in FIG. 6 as an example, the multi-shaft manipulator 600 serving as the driving component of the tube picking module 530 is described.

The multi-shaft manipulator 600 is composed of an X-shaft 610, a Z-shaft 620, and an R-shaft 630. The R-shaft 630 and the Z-shaft 620 are installed on the X-shaft 610 through a fixed seat 640; the X-shaft 610 can move horizontally, the Z-shaft 620 can move up and down, and the R-shaft 630 can rotate. The R-shaft 630 has a Z-shaped structure and is divided into a first vertical segment 632, a horizontal segment 634, and a second vertical segment 636, where the first vertical segment 632 passes through the partition structure 321. The horizontal segment 634 and the second vertical segment 636 move within the lower compartment 328 all the time. Since the movement trajectory of the R-shaft 630 in the horizontal direction is a straight line, the mechanism movement port 322 in the partition structure 321 can be designed in a shape of narrow groove, which effectively reduces a communication area between the upper compartment 327 and the lower compartment 328 and reduces the transfer efficiency of cryo-temperature from the lower compartment 328 to the upper compartment 327.

Figure 4:
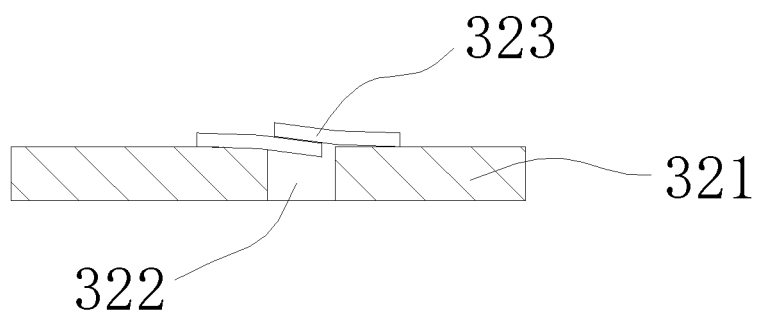
FIG. 4 is a schematic structural view of a sealing member at a mechanism movement port according to an embodiment of the present disclosure.
Figure 5:
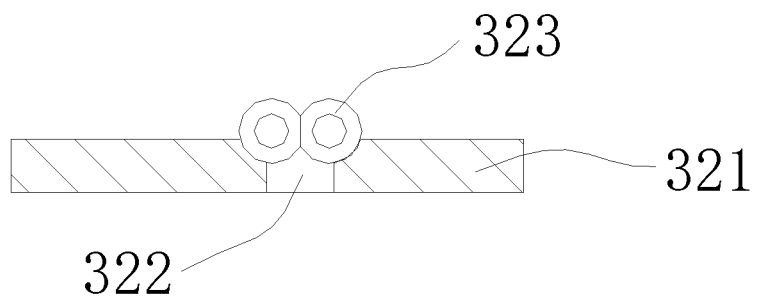
FIG. 5 is a schematic structural view of a sealing member at a mechanism movement port according to another embodiment of the present disclosure.

For example, as shown in FIG. 6, the sealing member 323 may use two organ-type protective covers. One ends of the two organ-type protective covers are respectively fixed to a front end of the mechanism movement port 322 and a rear end of the mechanism movement port 322, and the other ends of the two organ-type protective covers are fixed to fixed seats 640. The organ-type protective cover extends and retracts along with the movement of the X-shaft 610, and can cover the mechanism movement port 322. For another example, as shown in FIG. 4, the sealing member 323 includes two flexible sheets that overlap and cover each other. When the first vertical segment 632 passes through, the flexible sheets are stretched apart. When the first vertical segment 632 does not pass through, the flexible sheets may remain overlapping, and perform the function of covering the mechanism movement port 322. For another example, as shown in FIG. 5, the sealing member 323 includes two hollow flexible tubes, and when the first vertical segment 632 passes through, the flexible tubes on the two sides will be stretched apart, and when the first vertical segment 632 does not pass through, the flexible tubes on the two sides will be squeezed to move towards the middle, which performs the function of covering the mechanism movement port 322.

Further, the partition structure 321 is provided with a transparent plate 324 capable of enable light to transmit from one to another between the upper compartment 327 and the lower compartment 328. A machine vision module 325 is provided on an upper compartment 327 side of the transparent plate 324. The transparent plate 324 is made of a material with high light transmittance. In order to ensure the thermal insulation effect, the transparent plate 324 may be embodied as a thickened, hollow or vacuum structure. The machine vision module 325 includes an image capturing unit and an image processing unit. The image capturing unit is used to take pictures of the tube picking state in the lower compartment 328, and the image processing unit analyzes to obtain the real-time position coordinates of the cryopreservation trays 30, the cryopreservation tubes 20 and the sample box 40. The obtained real time position coordinates are fed back to the tube picking module 530 through the control system, to enable the tube picking module 530 to accurately pick tubes, thereby improving the success rate of tube picking, reducing requirements for the positioning accuracy of the cryopreservation trays 30 and the sample box 40, and avoiding the phenomenon of poor positioning accuracy caused by a large shrinkage of materials in the cryogenic environment.

In addition, it may also use the tube picking module 530 to touch multiple fixed positions on the cryopreservation tray 30 and the sample box 40, to obtain signals through the changes of parameters such as weak voltage, torque, electrical signals, and the obtained signals are fed back to the control system to control the position adjustment of the tube picking module 530, to calibrate the position of the tube picking module 530 in time. For example, in the case where the aforementioned multi-shaft manipulator 600 is used in the tube picking module 530, a piezoelectric element may be provided at the end of the multi-shaft manipulator 600, to sense changes through pressure, so as to obtain the position information.

Please continue to refer to FIG. 1, in some embodiments, the top of the first compartment 320 in the height direction is provided with a first sealing hood 326 in communication with the upper compartment 327, and the top of the second compartment 330 in the height direction is provided with a second sealing hood 332 in communication with the second compartment 330. In order to enrich the temperature divisions of the insulated chamber 300 to allow more mechanical components and electrical components to be located at positions with a relatively high temperature, the first sealing hood 326 in communication with the upper compartment 327 is further provided on the top of the first compartment 320, and the first sealing hood 326 is made of a thin plate material with good thermal conductivity. With such a configuration, the temperature inside the first sealing hood 326 is close to the outside room temperature, thus forming a room temperature region. In this case, the mechanical parts and electrical parts can be moved up relatively, to allow more of which to be located in the room temperature region, so as to further improve the operation reliability of the automation module. In addition, a first partition plate with an opening is used between the upper compartment 327 and the first sealing hood 326, and the first partition plate is made of a thermal insulation material. Further, the principle of the second sealing hood 332 is similar to that of the first sealing hood 326, and a second partition plate 334 having an opening is also used between the second compartment 330 and the second sealing hood 332, which will not be repeatedly described herein. The top of the second sealing hood 332 in the height direction is provided with a gas outlet 336 for discharging vaporized liquid nitrogen gas, and a heating module 338 is further provided at the gas outlet 336 to prevent frosting and dew condensation on the gas outlet 336.

The rotary-disk rotating module 500 includes a first driving assembly and a rotation assembly driven by the first driving assembly, the first driving assembly is at least partially located between the second compartment 330 and the second sealing hood 332, the rotation assembly is located inside the second compartment 330, and the rotation assembly is fitted to the rotary-disk assembly 220. With such an arrangement, the first driving assembly can have the motor with poor low temperature resistance arranged on the second partition plate 334, that is, in a space defined by the second sealing hood 332 and the second partition plate 334. The first driving assembly can be embodied to have a common motor to reduce the production cost, and the first driving assembly and the rotation assembly are disposed in compartments with different temperatures, thereby the service life of each of the components is increased. The first driving assembly includes a motor and a mounting frame, etc. The motor has a motor shaft, the rotation assembly includes a transmission shaft connected to the motor shaft, and a coupling for connecting the motor shaft and the transmission shaft. The transmission shaft is configured to be fitted with the rotary-disk assembly 220. Herein, the fitting may be a connection relationship, such as welding, screw locking, or may be a position-limiting and matching relationship in the radial direction, such as engagement between a groove and a protrusion. In this way, the rotation of the transmission shaft can drive the rotary-disk assembly 220 to rotate. The rotation angle of the rotary-disk assembly 220 can be controlled by a sensor to achieve a relatively accurate rotation angle.

The basket lifting module 510 includes a second driving assembly and a lifting assembly driven by the second driving assembly. The second driving assembly is located at least partially between the second compartment 330 and the second sealing hood 332, the lifting assembly is located inside the second compartment 330, and the lifting assembly is fitted to the automatic cover 240. With such an arrangement, the second driving assembly can have the motor with poor low temperature resistance arranged on the second partition plate 334, that is, in a space defined by the second sealing hood 332 and the second partition plate 334. The second driving assembly may be embodied to have a common motor to reduce the production cost, and the second driving assembly and the lifting assembly are disposed in compartments with different temperatures, thereby the service life of each of the components is increased. The second driving assembly includes a motor and a mounting frame, etc. The motor has a motor shaft, and the lifting assembly can be in the form of a chain, a pulling rope, a belt, a timing belt, a rack and gear, a ball screw, and the like. The lifting assembly is fitted to the automatic cover 240. Herein, the fitting may be a connection relationship, such as welding, screw locking, or may be a position-limiting and matching relationship in the vertical direction, such as clamping jaws, hooks, to enable the lifting assembly to lift the automatic cover 240 in the vertical direction. For example, the lifting assembly includes a gear that is fitted to the motor shaft and a rack that meshes with the gear. The rack is fixedly connected to the automatic cover 240, and is driven to move up and down by the motor, thereby driving the automatic cover 240 to move up and down, so as to realize the moving up and down of a basket 230.

The tray shoveling module 520 includes a third driving assembly 522 and a tray shoveling assembly 524 driven by the third driving assembly 532. The third driving assembly 522 is located at least partially between the upper compartment 327 and the first sealing hood 326, and the tray shoveling assembly 524 is located inside the lower compartment 328. The tray shoveling assembly 524 is located at the bottom of the lower compartment 328, and the third driving assembly 522 extends from the lower compartment 328 to a space defined by the first partition plate and the first sealing hood 326. With such an arrangement, the third driving assembly 522 can have the motor with poor low temperature resistance arranged on the first partition plate, that is, in the space defined by the first sealing hood 326 and the first partition plate. The third driving assembly 522 can be embodied to have a common motor to reduce the production cost, and the third driving assembly 522 and the tray shoveling assembly 524 are disposed in compartments with different temperatures, thereby the service life of each of the components is increased. The third driving assembly 522 includes a motor and components such as a chain, a rack and a gear, or a ball screw that drives the tray shoveling assembly 524. The tray shoveling assembly 524 includes a shovel that can be driven. When a basket 230 is lifted to a specified height, the shovel shovels out a target cryopreservation tray 30 from the basket 230, and the shovel retrieves the target cryopreservation tray 30 to a position close to the tube picking module 530.

The tube picking module 530 includes a fourth driving assembly 532 and a tube picking assembly 534 driven by the fourth driving assembly 532. The fourth driving assembly 532 is located at least partially between the upper compartment 327 and the first sealing hood 326, and the tube picking assembly 534 is located inside the lower compartment 328. The tube picking assembly 534 is located inside the lower compartment 328, and the fourth driving assembly 532 extends from the lower compartment 328 to the space defined by the first partition plate and the first sealing hood 326. With such an arrangement, the fourth driving assembly 532 can have the motor with poor low temperature resistance arranged on the first partition plate, that is, in the space defined by the first sealing hood 326 and the first partition plate. The fourth driving assembly 532 can be embodied to have a common motor to reduce the production cost, and the fourth driving assembly 532 and the tube picking assembly 534 are disposed in compartments with different temperatures, thereby the service life of each of the components is increased. The fourth driving assembly 532 includes a motor or an electric cylinder, etc., and a manipulator driven by the motor or the electric cylinder. The manipulator may be in a form of a chain, a belt, a timing belt, a rack and a gear, a ball screw, or the like. The tube picking assembly 534 includes a tube taking apparatus disposed at the end of the manipulator, and the tube taking apparatus may be embodied as a mechanical gripper mechanism or a vacuum suction mechanism for automatically depositing and taking the cryopreservation tube 20. The tube taking apparatus takes a target cryopreservation tube 20 from the shovel or from the transfer container 400.

Please continue to refer to FIG. 1 and FIG. 2, in some embodiments, an inner sealing cover 350 configured to close the tube outlet 329 is provided inside the first compartment 320, and an outer sealing cover 360 configured to close the tube outlet 329 is provided outside the first compartment 320. The inner sealing cover 350 and the outer sealing cover 360 in the non-tube depositing and retrieving state perform a double-layer sealing function for the first compartment 320. The inner sealing cover 350 can be driven to open and close by means of a chain, a pulling rope, a belt, a timing belt, a gear, a worm and a gear, a ball screw, etc., and a driving module 352 for the inner sealing cover 350 is located at a position of the first compartment 320. The outer sealing cover 360 can be driven to open and close also by a chain, a pulling rope, a belt, a timing belt, a gear, a worm and gear, a ball screw, or the like. When the depositing operation is started, the outer sealing cover 360 is removed first, then the transfer container 400 is moved to the tube outlet 329, and the tube outlet 329 is sealed, and finally the inner sealing cover 350 is removed. The two sealing operations prevent cryo-temperature in the first compartment 320 from communicating with the room temperature outside the first compartment 320, and the two sealing operations are performed successively, so as to ensure the sealing performance and thermal insulation of the first compartment 320. The inner sealing cover 350, the outer sealing cover 360 and the transfer container 400 are mechanisms which are play a role for multiple sealing and are independent from each other. Specifically, the sealing herein may be implemented by only one of or a combination of the inner sealing cover 350, the outer sealing cover 360, or the transfer container 400. The above-mentioned sealing may be implemented by all of the above-mentioned sealing components, but cannot be implemented by none of the above-mentioned sealing components, so as to ensure good sealing performance and thermal insulation.

Figure 3:
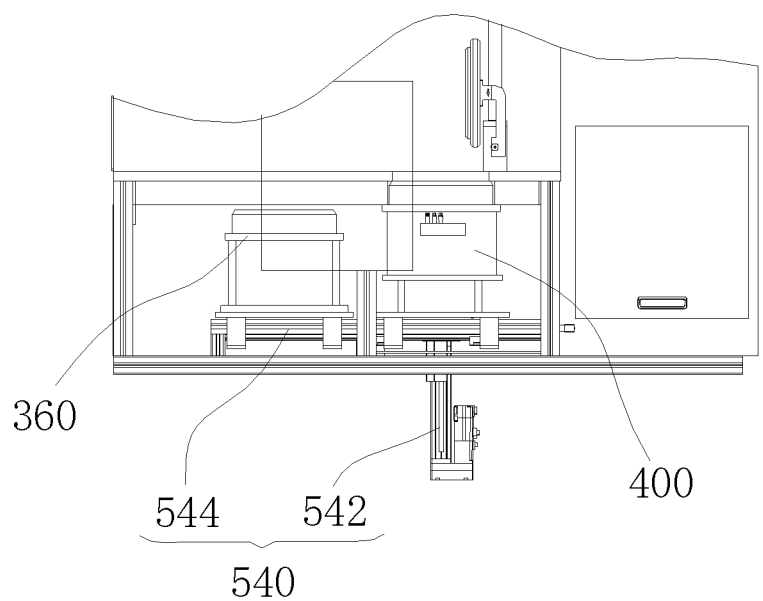
FIG. 3 is a schematic view showing a position of an outer sealing member in the automatic biological sample library in FIG. 2.

Please continue to refer to FIG. 3, in some embodiments, the transfer module 540 includes an elevating assembly 542 and a translating assembly 544 which are connected to each other. The translating assembly 544 or the elevating assembly 542 is provided with a pallet, and the transfer container 400 is placed on the pallet. The elevating assembly 542 is configured to lift the transfer container 400 to a position where the tube outlet 329 is located or lower the transfer container 400 from the position where the tube outlet 329 is located. The elevating assembly 542 can be driven by means of a chain, a pulling rope, a belt, a timing belt, a rack and a gear, a ball screw, or other means. The translating assembly 544 is configured to move the transfer container 400 from other positions to the position where the tube outlet 329 is located or to move the transfer container 400 away from the position where the tube outlet 329 is located to other positions. The translating assembly 544 can be driven by means of a chain, a pulling rope, a belt, a timing belt, a rack and a gear, a ball screw and other means. The other positions may be understood as a cover opening position or a cover closing position. The elevating assembly 542 and the translating assembly 544 are in a connection relationship. The connection relationship may be understood as a first type: in which, the translating assembly 544 and the elevating assembly 542 may have relative translational and vertical movement therebetween, and in this case, the translating assembly 544 can drive the elevating assembly 542 and the transfer container 400 to move to the position where the tube outlet 329 is located or move to other positions, and the elevating assembly 542 can drive the transfer container 400 to rise or fall. The connection relationship may also be understood as a second type: in which, the translating assembly 544 and the elevating assembly 542 may have relative vertical movement therebetween, and in this case, the translating assembly 544 can drive the transfer container 400 to move to the position where the tube outlet 329 is located or to other positions, and the elevating assembly 542 is arranged at the tube outlet 329 and can drive the transfer container 400 to rise or fall.

The description will be given by taking that the translating assembly 544 and the elevating assembly 542 may have relative vertical movement therebetween as an example. As a specific solution, the pallet is arranged on the translating assembly 544. For example, the pallet can slide on the translating assembly 544 by means of sliding rails. When the transfer container 400 is required to be transported from other positions to the position where the tube outlet 329 is located, the translating assembly 544 drives the pallet to move, and the pallet synchronously drives the transfer container 400 to move to a position below the tube outlet 329. At this time, the elevating assembly 542 can directly lift the pallet, and synchronously bring the transfer container 400 to ascend to the position where the tube outlet 329 is located and seal the tube outlet 329; or, an opening is provided in the pallet, and the elevating assembly 542 can move beyond the opening and lift only the transfer container 400 until the transfer container 400 seals the tube outlet 329.

The manner in which the transfer container 400 rises is not limited. When the transfer container 400 is required to be removed from the tube outlet 329, the removal process is opposite to the above-described process, which will not be repeatedly described herein.

Figure 7:
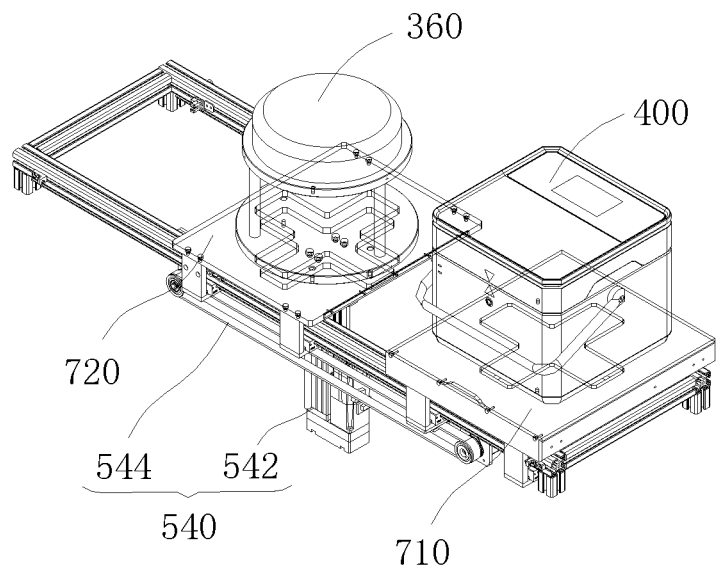
FIG. 7 is a schematic view showing how a transfer module is fitted to a pallet according to an embodiment of the present disclosure.

As shown in FIG. 7, the pallet for holding the transfer container 400 is defined as a first pallet 710, and a second pallet 720 for holding the outer sealing cover 360 may further be provided on the translating assembly 544. The second pallet 720 is arranged at a side of the first pallet 710, and the two pallets are placed side by side. The translating assembly 544 can drive the second pallet 720 and the outer sealing cover 360 to move away from the position below the tube outlet 329 or move to the position below the tube outlet 329, and the elevating assembly 542 can directly lift the second pallet 720 and synchronously brings the outer sealing cover 360 to ascend to the position where the tube outlet 329 is located and seals the tube outlet 329; or an opening is provided in the second pallet 720, and the elevating assembly 542 can move beyond the opening and lift only the outer sealing cover 360 until the outer sealing cover 360 seals the tube outlet 329. The process in which the elevating assembly 542 drives the outer sealing cover 360 to descend is opposite to the above process, and will not be repeatedly described herein. When the translating assembly 544 drives the first pallet 710 and the transfer container 400 to move to the position below the tube outlet 329, the second pallet 720 and the outer sealing cover 360 move synchronously from the position below the tube outlet 329 to a position at a side of the tube outlet 329. When the translating assembly 544 drives the first pallet 710 and the transfer container 400 to move away from the position below the tube outlet 329, the second pallet 720 and the outer sealing cover 360 move synchronously from the position at the side of the tube outlet 329 to the position below the tube outlet 329.

Figure 8:
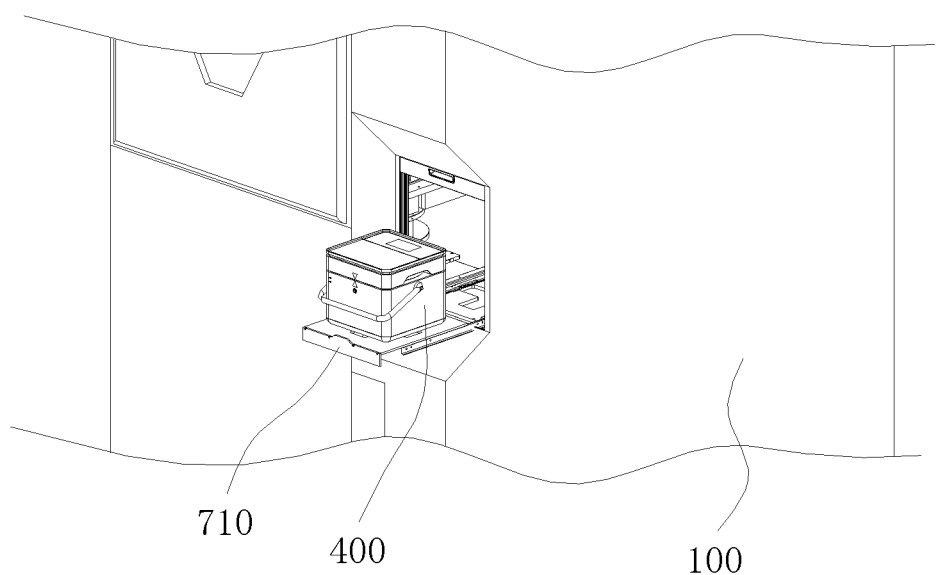
FIG. 8 is a schematic view of a pallet that can be drawn or pulled according to an embodiment of the present disclosure.

In addition, as shown in FIG. 8, the first pallet 710 for holding the transfer container 400 can also be directly separated from the translating assembly 544 by being pulled or drawn from a cover-opening position or a cover-closing position, so as to facilitate manually removing the transfer container 400 and the first pallet 710 from the translating assembly 544. When the first pallet 710 fails, it can also be removed for replacement.

Please continue to refer to FIG. 2, in some embodiments, the insulated chamber 300 is provided with a manual intervention port 370, the insulated chamber 300 is further provided with an intervention port sealing cover 372 for closing the manual intervention port 370, and an observation window 374. During normal operation of the automation module, the manual intervention port 370 is closed by the intervention port sealing cover 372. When the automation module fails, an operator opens the intervention port sealing cover 372, and performs manual assisted operations through the manual intervention port 370, and the manual intervention port 370 may also has operation gloves attached thereto. The observation window 374 is convenient for the operator to observe the situation in the insulated chamber 300 in time. The observation window 374 is made of a high light transmittance material, and for ensuring the temperature insulation effect, a thickened structure, a hollow structure or a vacuum structure can be used for the observation window 374. A dew removal module 376 is further provided on a side of the observation window 374. the dew removal module 376 is configured to remove water droplets or water mist when the water droplets or water mist are condensed on the surface of the observation window 374 in cold temperature, to keep the clearness of the observation window 374.

Please continue to refer to FIG. 1, in some embodiments, the automatic biological sample library 10 further includes a code scanning module 550 arranged outside the first compartment 320. The code scanning module 550 is electrically connected to the control system and is configured to scan a code of the cryopreservation tube 20 retrieved by the tube picking module 530, for identification, and the first compartment 320 is provided with a light-transmittable code scanning window 552 at a position corresponding to the code scanning module 550. The code scanning module 550 may be a code scanner. Each cryopreservation tube 20 is provided with an identification code, such as a one-dimensional code, a two-dimensional code. When a cryopreservation tube 20 is retrieved by the tube picking module 530, the cryopreservation tube 20 may have its code scanned by the code scanning module 550 for being identified. When the information of the cryopreservation tube 20 is checked with information of a required target cryopreservation tube 20 and is confirmed in case of no error, the cryopreservation tube 20 is placed into the sample box 40 of the transfer container 400 or into the cryopreservation tray 30 carried by the tray shoveling module 520, thereby realizing automatic identification and recording of biological sample information.

Since the temperature in the insulated chamber 300 is relatively low, the code scanning module 550 is arranged outside the first compartment 320, specifically, the code scanning module 550 may be arranged at the bottom of the lower compartment 328 outside the lower compartment 328. The light-transmittable code scanning window 552 is provided in a wall of the lower compartment 328 at a position corresponding to the code scanning module 550, to enable the code scanning module 550 to scan, through the scanning window 552, the cryopreservation tube 20 in the lower compartment 328. In order to ensure the temperature insulation effect, the code scanning window 552 is embodied as a thickened structure, a hollow structure or a vacuum structure. A dew removal module 554 is further provided on a side of the code scanning window 552 to remove water droplets or water mist. Apparently, the code scanning module 550 may also be arranged at least partially in the lower compartment 328, to allow some mechanical components and electronic components in the code scanning module 550 to be located in a region at room temperature outside the lower compartment 328.

Please continue to refer to FIG. 1, in some embodiments, the automatic biological sample library 10 further includes a cover opening module 560 arranged on the frame 100 and configured to automatically perform cover-opening or cover-closing for the transfer container 400. The cover opening module 560 is arranged above a support table on which the transfer container 400 is placed, and the cover opening module 560 can be lifted up or lowered down to the position where the tank body cover of the transfer container 400 is located, and open the tank body cover by clamping rotation or buckle lifting, etc., and transfer the transfer container 400 through the transfer module 540 to the tube outlet 329 of the lower compartment 328; or, close the tank body cover by clamping rotation or a buckle depression. Apparently, when the cover opening module 560 fails, the cover can also be opened manually to perform emergency treatment.

The automatic tube storage process of the automatic biological sample library 10 is described hereinafter with reference to the specific structures.

Figure 9:
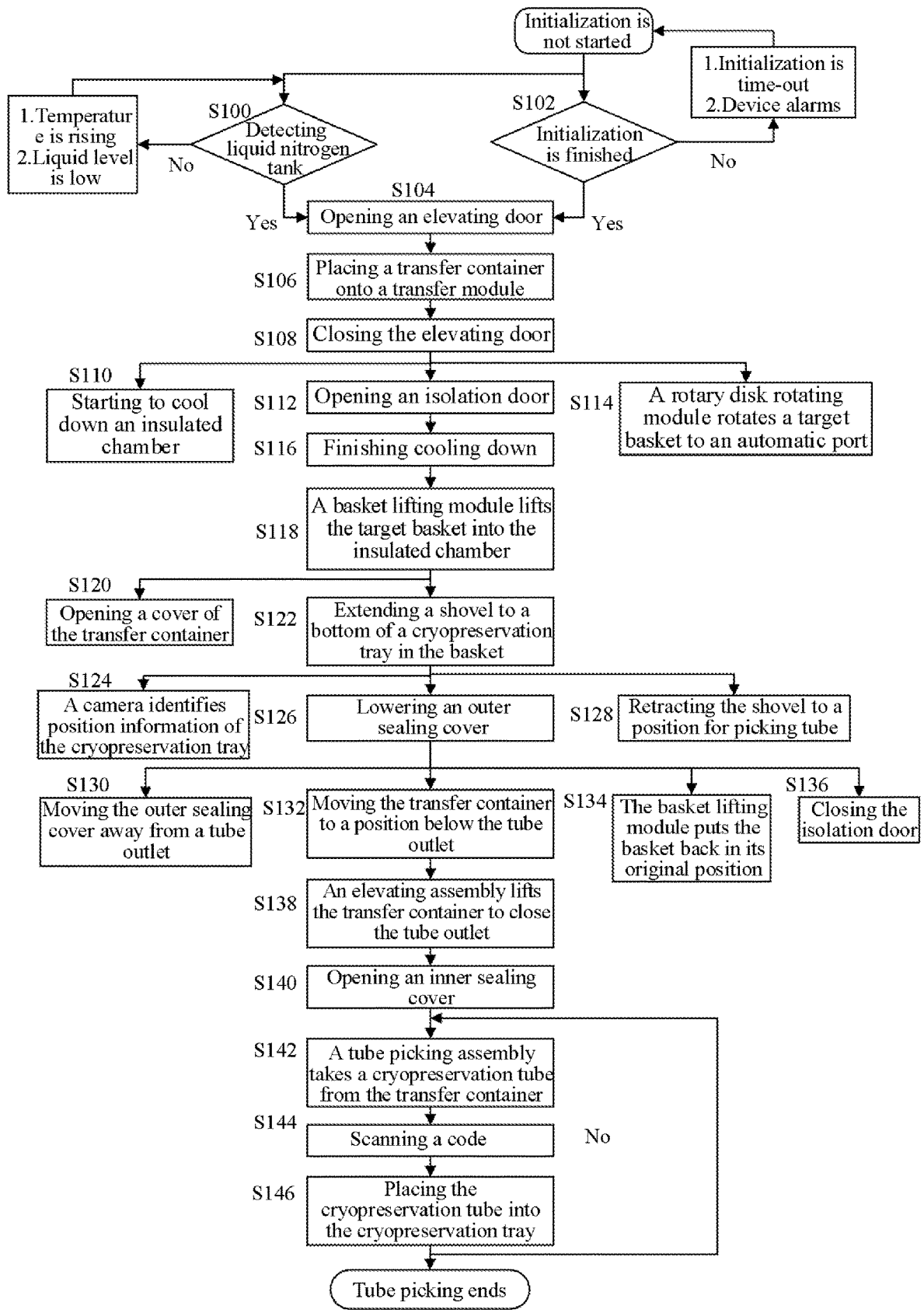
FIG. 9 is a schematic flowchart of automatically depositing a tube to an automatic biological sample library according to an embodiment of the present disclosure.

Please refer to the tube picking flow chart shown in FIG. 9, first, an uninitialized sample library is initialized, the upper computer sends an instruction to the PLC control system, to perform an operation at S102 to determine whether the initialization finishes, and perform an operation at S100 to determine whether the detection result of the liquid nitrogen tank meets preset temperature and liquid level requirements. When both determination results are yes, an operation at S104 is performed to open the elevating door, an operation at S106 is performed to manually or automatically place the transfer container onto the transfer module, an operation at S108 is performed to close the elevating door, an operation at S110 is performed to start cooling the insulated chamber, an operation at S112 is performed to open the isolation door, an operation at S114 is performed to allow the rotary-disk rotating module to rotate a target basket to the automatic port, an operation at S116 is performed to end the cooling process, an operation at S118 is performed to allow the basket lifting module to lift the target basket into the insulated chamber, that is, above the automatic port, an operation at S120 is performed to manually or automatically open the cover of the transfer container, an operation at S122 is performed to extend a shovel to the bottom of a target cryopreservation tray in the basket, an operation at S124 is performed to identify position information of the cryopreservation tray with a camera, an operation at S126 is performed to lower the outer sealing cover, an operation at S128 is performed to allow the shovel to drive the target cryopreservation tray to retract to the tube picking position, an operation at S130 is performed to move the outer sealing cover away from the tube outlet, an operation at S132 is performed to move the transfer container to a position below the tube outlet, an operation at S134 is performed to allow the basket lifting module to put the basket back in its original position, an operation at S136 is performed to close the isolation door, an operation at S138 is performed to use the elevating assembly to lift the transfer container to close the tube outlet, an operation at S140 is performed to open the inner sealing cover, an operation at S142 is performed to retrieve the cryopreservation tube from the transfer container by using the tube picking assembly, an operation at S144 is performed to scan the code of the cryopreservation tube for identification, and an operation at S146 is performed to put the cryopreservation tube into the cryopreservation tray. If the tube picking is finished, it is ready to make the device to enter a return state. If the tube picking is not finished, it is continued to perform operations at S142, S144, and S146.

Figure 10:
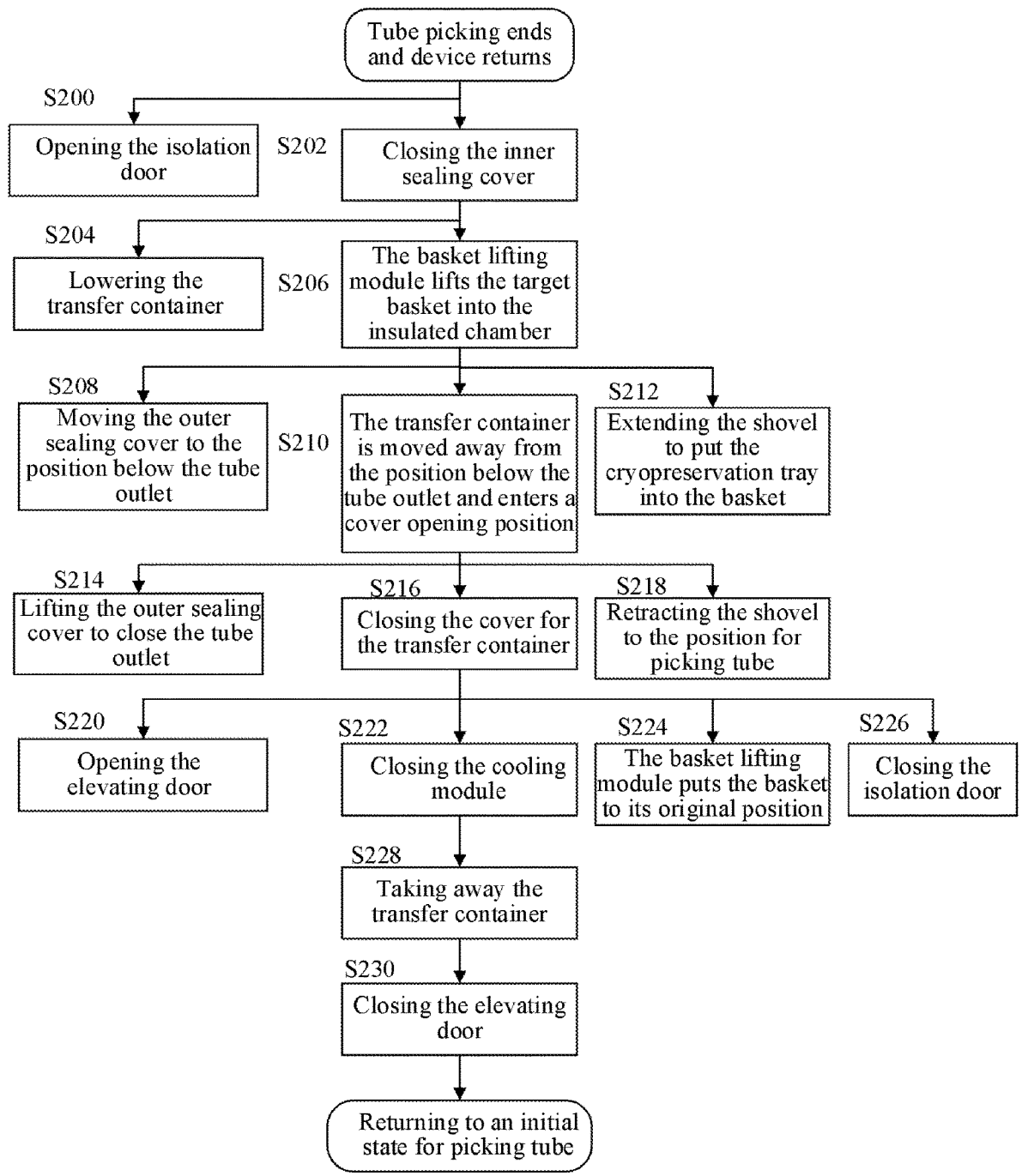
FIG. 10 is a schematic flowchart of retrieving the tube deposited from the automatic biological sample library according to an embodiment of the present disclosure.

Please refer to the flowchart of the device returning after the tube picking finishes as shown in FIG. 10, after the tube picking finishes, an operation at S200 is performed to open the isolation door, an operation at S202 is performed to close the inner sealing cover, an operation at S204 is performed to lower the transfer container, an operation at S206 is performed to allow the basket lifting module to lift the target basket into the insulated chamber, an operation at S208 is performed to move the outer sealing cover to the position below the tube outlet, an operation at S210 is performed to enable the transfer container to move away from the position below the tube outlet and enter the preset cover opening position, an operation at S212 is performed to allow the shovel to extend to put the cryopreservation tray containing the target cryopreservation tube back into the basket, an operation at S214 is performed to lift the outer sealing cover to close the tube outlet, an operation at S216 is performed to close the cover for the transfer container, an operation at S218 is performed to allow the shovel to retract to the tube picking position, an operation at S220 is performed to open the elevating door, an operation at S222 is performed to close the cooling module, an operation at S224 is performed to allow the basket lifting module to put the basket to its original position, an operation at S226 is performed to close the isolation door, an operation at S228 is performed to take out the transfer container manually or automatically, and an operation at S230 is performed to close the elevating door, and finally the device returns to the initial state of tube picking.

In the embodiments of the present disclosure, the automatic tube retrieving process of the automatic biological sample library is roughly the same as the automatic tube depositing process, and the difference therebetween lies in that in the automatic tube retrieving process, the tube picking assembly takes the target cryopreservation tube from the target cryopreservation tray and puts it into the transfer container.

The technical features of the above embodiments can be combined arbitrarily. For the sake of brevity of the description, not all possible combinations of the technical features in the above embodiments are described. However, as long as there is no contradiction in the combinations of these technical features, those combinations should be construed as falling into the range set forth in this specification.

What is claimed is:
1. An automatic biological sample library, comprising:
a frame;
an upper computer, which is arranged on the frame;
a control system, which is electrically connected to the upper computer;
a liquid nitrogen tank, which is arranged on the frame and comprises a first insulated tank body, a rotary-disk assembly accommodated in the first insulated tank body, a plurality of baskets placed on the rotary-disk assembly, and an automatic cover capable of being selectively fitted with any one of the multiple baskets;
an insulated chamber arranged to cover above the automatic cover and comprising a first compartment and a second compartment which are in communication with each other through a communicative port, and the first compartment being provided with a tube outlet, and the second compartment being internally provided with a cooling module therein;
a transfer container, which is arranged on the frame and comprises a second insulated tank body, a sample holder accommodated in the second insulated tank body, and a tank body cover for closing the second insulated tank body, the sample holder being configured to hold a cryopreservation tube that is moved in or moved out through the tube outlet;
a rotary-disk rotating module, which is electrically connected to the control system and is at least partially arranged in the second compartment, wherein the rotary-disk rotating module is configured to cooperate with the rotary-disk assembly to drive the rotary-disk assembly to rotate;
a basket lifting module, which is electrically connected to the control system and is at least partially arranged in the second compartment, wherein the basket lifting module is configured to cooperate with the automatic cover to drive the automatic cover to rise and fall;
a tray shoveling module, which is electrically connected to the control system, and is at least partially arranged in the first compartment, and is configured to deposit a cryopreservation tray into a basket lifted by the basket lifting module, or retrieve a cryopreservation tray from a basket lifted by the basket lifting module;
a tube picking module, which is electrically connected to the control system, and is at least partially arranged in the first compartment, and is configured to deposit a cryopreservation tube into a cryopreservation tray shoveled by the tray shoveling module, or retrieve a cryopreservation tube from a cryopreservation tray shoveled by the tray shoveling module, and is configured to move in or move out a cryopreservation tube through the tube outlet; and a transfer module, which is electrically connected to the control system, and is arranged on the frame, and is capable of driving the transfer container to move into the tube outlet or move away from the tube outlet.

2. The automatic biological sample library according to claim 1, wherein the liquid nitrogen tank further comprises a manual cover and a quick detachment mechanism configured to lock the manual cover.

3. The automatic biological sample library according to claim 1, wherein the first compartment is provided with a partition structure at a position higher than the communicative port, the partition structure partitions the first compartment into an upper compartment and a lower compartment in a height direction, and the partition structure is provided with a mechanism movement port via which the upper compartment is in communication with the lower compartment.

4. The automatic biological sample library according to claim 3, wherein a top of the first compartment in a height direction is provided with a first sealing hood in communication with the upper compartment, and a top of the second compartment in a height direction is provided with a second sealing hood in communication with the second compartment;

the rotary-disk rotating module comprises a first driving assembly and a rotation assembly driven by the first driving assembly, the first driving assembly is at least partially located between the second compartment and the second sealing hood, the rotation assembly is located inside the second compartment, and the rotation assembly is fitted to the rotary-disk assembly;

the basket lifting module comprises a second driving assembly and a lifting assembly driven by the second driving assembly, the second driving assembly is located at least partially between the second compartment and the second sealing hood, the lifting assembly is located inside the second compartment, and the lifting assembly is fitted to the automatic cover;

the tray shoveling module comprises a third driving assembly and a tray shoveling assembly driven by the third driving assembly, the third driving assembly is located at least partially between the upper compartment and the first sealing hood, and the tray shoveling assembly is located inside the lower compartment; and the tube picking module comprises a fourth driving assembly and a tube picking assembly driven by the fourth driving assembly, the fourth driving assembly is located at least partially between the upper compartment and the first sealing hood, and the tube picking assembly is located inside the lower compartment.

5. The automatic biological sample library according to claim 3, wherein the partition structure is provided with a transparent plate capable to enable light transmitting from one to another between the upper compartment and the lower compartment, and a machine vision module is provided on a side of the upper compartment at the transparent plate.

6. The automatic biological sample library according to claim 1, wherein an inner sealing cover configured to close the tube outlet is provided inside the first compartment, and an outer sealing cover configured to close the tube outlet is provided outside the first compartment.

7. The automatic biological sample library according to claim 1, wherein the insulated chamber is provided with a manual intervention port, and the insulated chamber is further provided with an intervention port sealing cover and an observation window, and wherein the intervention port sealing cover is configured for closing the manual intervention port.

8. The automatic biological sample library according to claim 1, wherein the transfer module comprises an elevating assembly and a translating assembly which are connected to each other, the translating assembly or the elevating assembly is provided with a pallet, and the transfer container is placed on the pallet.

9. The automatic biological sample library according to claim 1, further comprising a code scanning module arranged outside the first compartment, wherein the code scanning module is electrically connected to the control system and is configured to scan a code of a cryopreservation tube retrieved by the tube picking module, for identification, and wherein the first compartment is provided with a code scanning window at a position corresponding to the code scanning module, and the code scanning window is light-transmittable.

10. The automatic biological sample library according to claim 1, further comprises a cover opening module arranged on the frame and configured to automatically perform cover-opening or cover-closing for the transfer container.

* * * * *